(12) United States Patent
Katahira et al.

(10) Patent No.: US 12,358,239 B2
(45) Date of Patent: Jul. 15, 2025

(54) METHOD FOR PRODUCING COMPOSITE MATERIAL JOINT BODY

(71) Applicant: TOYOTA JIDOSHA KABUSHIKI KAISHA, Toyota (JP)

(72) Inventors: Natsuhiko Katahira, Toyota (JP);
Tatsuya Kojima, Okazaki (JP);
Takashi Ike, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 174 days.

(21) Appl. No.: 18/303,087

(22) Filed: Apr. 19, 2023

(65) Prior Publication Data
US 2024/0025133 A1 Jan. 25, 2024

(30) Foreign Application Priority Data
Jul. 19, 2022 (JP) .................. 2022-114538

(51) Int. Cl.
| | |
|---|---|
| B29C 70/40 | (2006.01) |
| B29C 65/48 | (2006.01) |
| B29C 70/24 | (2006.01) |
| B29C 70/44 | (2006.01) |
| B29C 70/54 | (2006.01) |
| B29C 43/36 | (2006.01) |
| B29L 23/00 | (2006.01) |

(52) U.S. Cl.
CPC .............. B29C 70/24 (2013.01); B29C 65/48 (2013.01); B29C 70/446 (2013.01); B29C 70/543 (2013.01); B29C 2043/3644 (2013.01); B29C 2043/3649 (2013.01); B29L 2023/00 (2013.01)

(58) Field of Classification Search
CPC ..... B29C 70/44; B29C 70/446; B29C 33/485; B29C 33/505
See application file for complete search history.

(56) References Cited

U.S. PATENT DOCUMENTS

| | | | |
|---|---|---|---|
| 2010/0196639 A1 | 8/2010 | Inazawa et al. | |
| 2012/0237356 A1* | 9/2012 | Mironov | F03D 3/062 156/331.7 |
| 2016/0354968 A1* | 12/2016 | Zamora Rodriguez | B29C 70/446 |

FOREIGN PATENT DOCUMENTS

| | | |
|---|---|---|
| JP | 58-56824 A | 4/1983 |
| JP | 2009-34885 A | 2/2009 |

* cited by examiner

*Primary Examiner* — Matthew J Daniels
(74) *Attorney, Agent, or Firm* — Oblon, McClelland, Maier & Neustadt, L.L.P.

(57) ABSTRACT

A method for producing a composite material joint body includes steps of: bonding a plurality of composite materials, forming a hollow body including at least a first cell and a second cell adjacent to the first cell, and adjusting a pressure so that a first pressure in the first cell is greater than a second pressure in the second cell. In the step of forming the hollow body, the first cell includes an expansion member pressurizing a first inner surface facing the first cell of a first cell member, and the second cell includes a gas pressurizing a second inner surface facing the second cell of a second cell member, and in the step of adjusting the pressure, the first pressure generated by the expansion member pressurizing the first inner surface is increased as compared with the second pressure generated by the gas pressurizing the second inner surface.

3 Claims, 7 Drawing Sheets

METHOD FOR PRODUCING COMPOSITE MATERIAL JOINT BODY

CROSS-REFERENCE TO RELATED APPLICATION

This application claims priority to Japanese Patent Application No. 2022-114538 filed on Jul. 19, 2022 incorporated herein by reference in its entirety.

BACKGROUND

1. Technical Field

The present disclosure relates to a method for producing a composite material joint body.

2. Description of Related Art

Japanese Unexamined Patent Application Publication No. 2009-034885 (JP 2009-034885 A) describes an internal pressure forming method as a method for forming a composite material joint body containing a fiber-reinforced resin and including a hollow portion. In the internal pressure forming method according to JP 2009-034885 A, when a plurality of fiber-reinforced resin members are joined with an adhesive, a bladder bag inserted into a hollow cell is expanded to bond the inside of the cell. When the internal pressure forming method according to JP 2009-034885 A is applied to a propeller or the like divided into a plurality of cells, the bladder bag needs to be inserted into all the cells.

SUMMARY

When the cell includes an undercut shape or the like, the bladder bag cannot be used for bonding the inside of the cell. Therefore, it is difficult to apply the internal pressure forming method to the method for producing the composite material joint body.

An object of the present disclosure is to solve such an issue, and an object thereof is to provide a method for producing a composite material joint body capable of holding an adhesive force obtained by joining a plurality of composite materials constituting a hollow portion even when it is difficult to insert the bladder bag.

A method for producing a composite material joint body according to an aspect of the present disclosure includes:
  a step of forming a hollow body including a plurality of cells including at least a first cell and a second cell adjacent to the first cell in the hollow body by joining a plurality of composite materials in which a resin is impregnated with a fiber; and
  a step of adjusting pressure such that first pressure in the first cell is greater than second pressure in the second cell.
In the step of forming the hollow body, the first cell includes an expansion member that pressurizes a first inner surface in contact with the first inner surface facing the first cell of a first cell member that surrounds the first cell;
  in the step of forming the hollow body, the second cell includes gas that pressurizes a second inner surface in contact with the second inner surface facing the second cell of a second cell member that surrounds the second cell; and
  in the step of adjusting the pressure, the first pressure generated by the expansion member pressurizing the first inner surface is increased as compared with the second pressure generated by the gas pressurizing the second inner surface.

In the method, in the step of forming the hollow body, a portion of the first cell member may include an overlapping portion in which the composite materials overlap each other in a thickness direction of the first cell member with an adhesive interposed between the composite materials.

In the method,
  the step of forming the hollow body may include a step of disposing a first mold such that a first surface of a first skin including the composite materials having skin shapes is set on a cavity side, the first skin including the first surface and a first back surface on an opposite side of the first surface and including a first front end and a first rear end on an opposite side of the first front end;
  the step of forming the hollow body may include a step of disposing a second mold such that a second surface of a second skin including the composite materials having skin shapes is set on the cavity side, the second skin including the second surface and a second back surface on an opposite side of the second surface and including a second front end and a second rear end on an opposite side of the second front end; and
  the step of forming the hollow body may include a step of combining the first mold and the second mold with the expansion member and a spar having a cylindrical shape interposed between the first mold and the second mold.

Here, in the step of combining the first mold and the second mold, the spar may be disposed between the first back surface and the second back surface.

In the step of combining the first mold and the second mold, the overlapping portion may be provided so as to be overlapped such that a portion of the first back surface on the first front end side and a portion of the second surface on the second front end side face each other with the adhesive interposed between the portion of the first back surface and the portion of the second surface.

In the step of combining the first mold and the second mold, the adhesive may be disposed between the first back surface and the spar, between the second back surface and the spar, and between a portion of the first back surface on the first rear end side and a portion of the second back surface on the second rear end side.

In the step of combining the first mold and the second mold, the expansion member may be disposed so as to be included in the first cell provided on the first front end side and the second front end side with respect to the spar between the first back surface and the second back surface.

In the step of combining the first mold and the second mold, the gas may be introduced into the second cell provided inside the spar.

In the method, the expansion member may include at least one of a bag that expands due to introduction of the gas into the expansion member and a mandrel that expands due to application of heat.

In the method,
  the expansion member may be a mandrel that expands due to application of heat; and in the step of adjusting the pressure, a temperature may be adjusted by a temperature control pipe in the first mold and the second mold, and the first pressure may be increased as compared with the second pressure.

According to the present disclosure, it is possible to provide the method for producing the composite material joint body capable of holding the adhesive force obtained by joining the composite materials constituting the hollow portion.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a specific configuration of the present embodiment will be described with reference to the drawings. The following description shows preferred embodiments of the present disclosure, and the scope of the present disclosure is not limited to the following embodiments. Further, not all of the configurations described in the present embodiment are essential as means for solving the problem. For clarity of explanation, the following description and the drawings are omitted and simplified as appropriate. In the drawings, the same elements are denoted by the same reference numerals, and redundant descriptions are omitted as necessary.

First Embodiment

In the method for producing a composite material joint body of the present embodiment, a hollow body having a plurality of hollow portions is manufactured by combining a plurality of composite materials. For example, a method of manufacturing a hollow body having a plurality of hollow portions such as a blade cross section includes a method of bonding a plurality of composite materials by a jig or the like, a method of integrally molding by solidifying a resin material with a mold, and the like. In the case where a plurality of composite materials constituting the hollow portion are joined by an adhesive, an internal pressure forming method is used in which an expansion member such as a bladder bag is inserted into the hollow portion and the member constituting the hollow portion is joined by the pressure of the expansion member. However, in the case where the inner diameter of the hollow portion has an undercut, such as an inner diameter larger than the inner diameter of the outlet, it is difficult to take out the expansion member inserted into the hollow portion. The method for producing the composite material joint body of the present embodiment produces the composite material joint body including the hollow portion having such an undercut shape.

Figure 1:
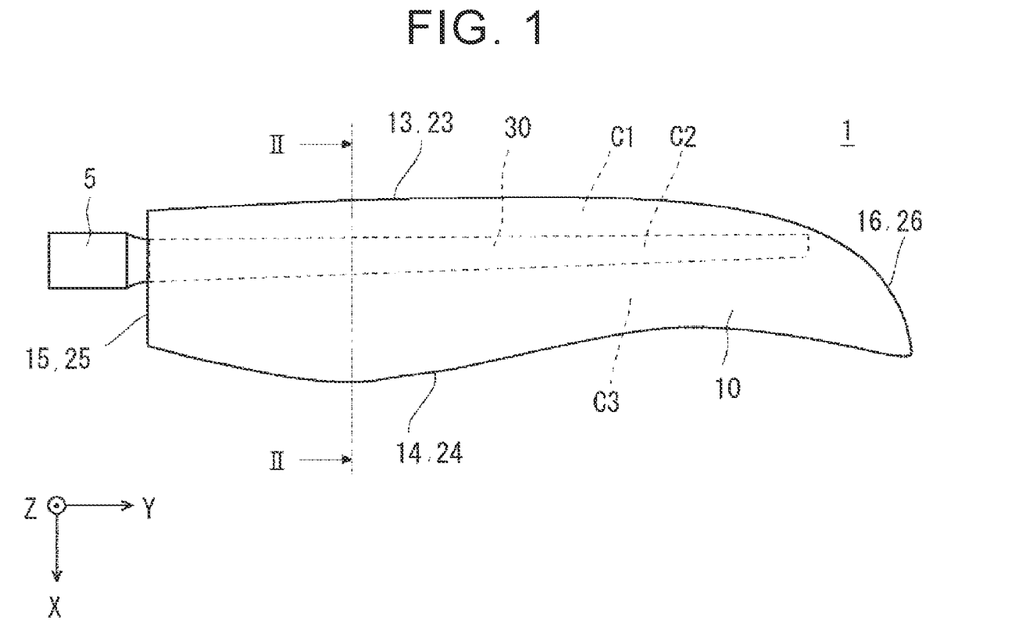
FIG. 1 is a top view illustrating a composite material joint body according to a first embodiment.
Figure 2:
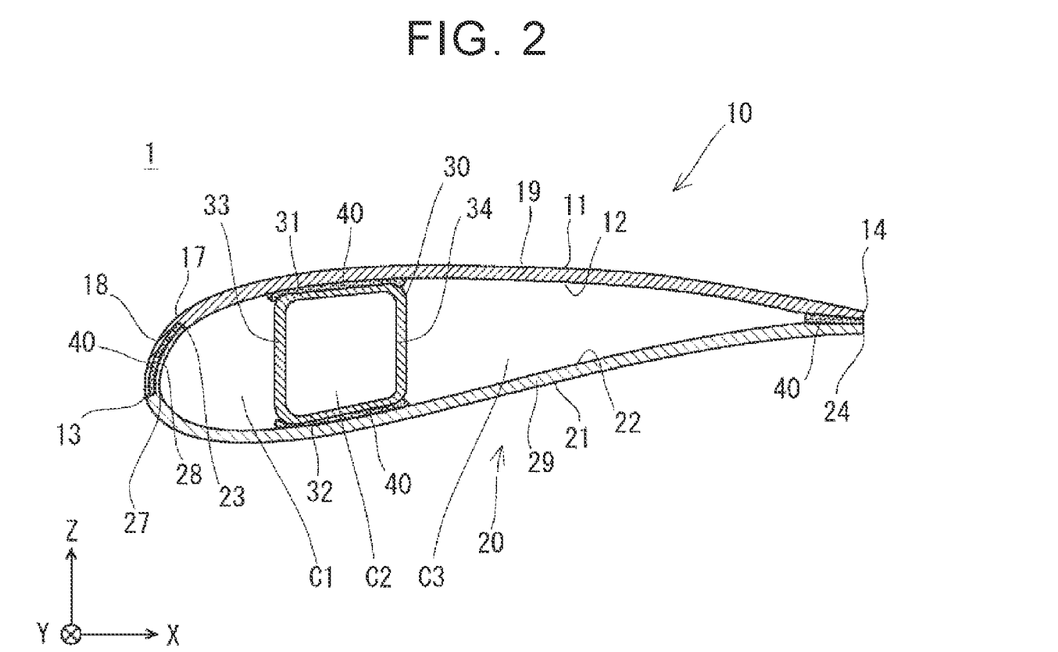
FIG. 2 is a cross-sectional view illustrating a composite material joint body according to the first embodiment, and shows a cross-section taken along II-II line in FIG. 1.
Figure 3:
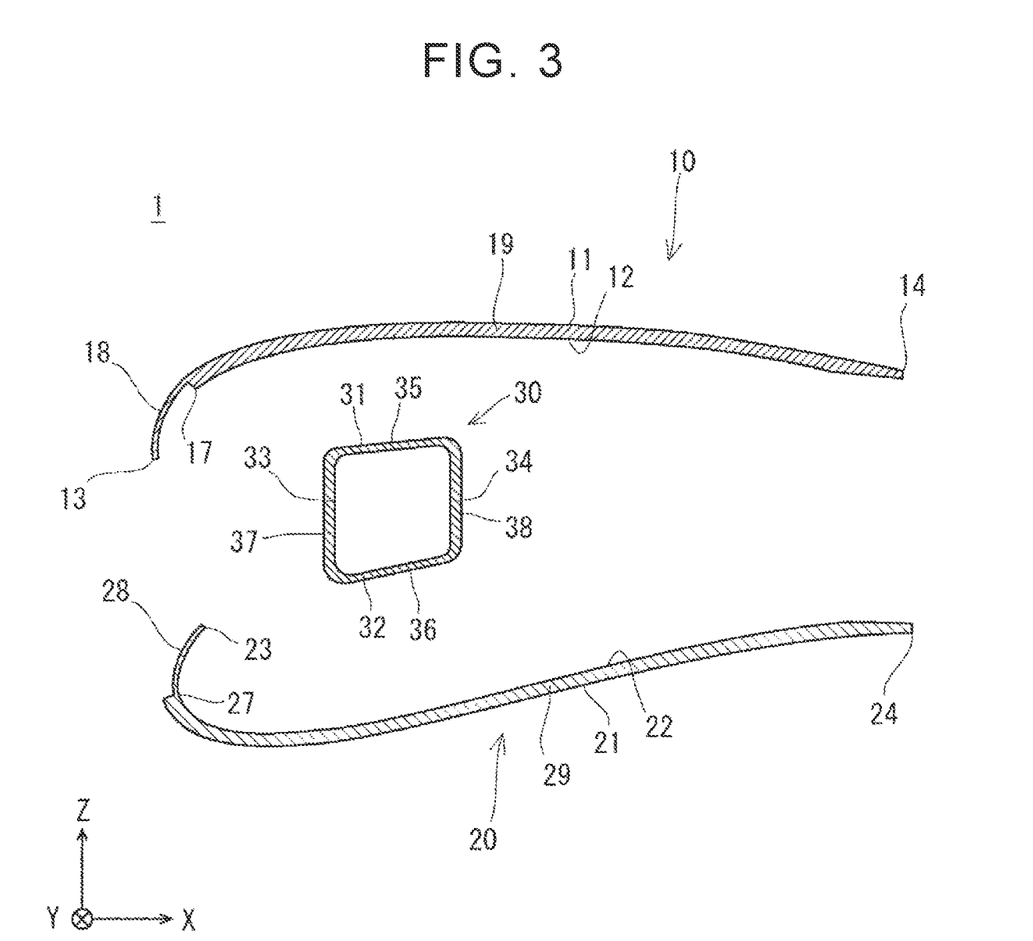
FIG. 3 is an exploded view illustrating the composite material joint body according to the first embodiment.

First, the composite material joint body of the present embodiment will be described. FIG. 1 is a top view illustrating a composite material joint body according to a first embodiment. FIG. 2 is a cross-sectional view illustrating the composite material joint body according to the first embodiment, and shows a cross-section taken along II-II line in FIG. 1. FIG. 3 is an exploded view illustrating the composite material joint body according to the first embodiment.

As illustrated in FIGS. 1 to 3, the composite material joint body 1 includes a first skin 10, a second skin 20, a spar 30, and an adhesive 40. The composite material joint body 1 has, for example, a wing-like shape or a propeller-like shape. Here, the XYZ Cartesian coordinate system is introduced for convenience of explanation of the composite material joint body 1. For example, the vertical direction is the Z axial direction, the upper direction is the +Z axial direction, and the lower direction is –Z axial direction. A direction extending from the root to the tip of the wing-shaped composite material joint body 1 is defined as a Y axial direction. A direction from the front end portion toward the rear end portion is defined as an X direction. Note that XYZ Cartesian coordinate system and the upper and lower sides are introduced for convenience of explanation of the composite material joint body 1, and do not indicate the orientation when the actual composite material joint body 1 is used.

The first skin 10 is, for example, a member positioned above the composite material joint body 1. The first skin 10 is a wing-shaped member extending in the Y axial direction. The first skin 10 includes a skin-like composite material.

The composite material is, for example, a general prepreg, and the resin impregnates the fiber. The fibers may be composed of carbon fibers, aramid fibers, nylon fibers, polyester fibers, or glass fibers, or any combination thereof, or the like, as a braid, fabric, or knitted fabric. The resin includes a thermosetting resin, and is, for example, an epoxy resin, a bismaleimide resin, a vinyl ester resin, an unsaturated polyester resin, a phenol resin, or a silicone resin.

The first skin 10 has a first surface 11 and a first back surface 12 opposite the first surface 11. The first skin 10 also has a first front end 13 and a first rear end 14 opposite the first front end 13. Furthermore, the first skin 10 has a first wing tip 16 opposite the first root portion 15 and the first root portion 15.

When viewed in the Y axial direction, the cross section of the first skin 10 is convex upward. The first skin 10 has a first surface 11 on the +Z axial direction side and a first back surface 12 on –Z axial direction side. The first skin 10 has a first front end 13 on –X axial side and a first rear end 14 on the +X axial side. The first skin 10 has a first root portion 15 on –Y axial direction side and a first rear end 14 on the +X axial direction side.

A portion of the first skin 10 on the first front end 13 side may be thinner than other portions. For example, a portion of the first back surface 12 of the first skin 10 on the first front end 13 side may be cut to be thinner than other portions. For example, the first connecting portion 17 to the first front end 13 side of the first skin 10 has a thin film shape. A portion of the first skin 10 from the first connecting portion 17 toward the first front end 13 is referred to as a first thin film portion 18. A portion of the first skin 10 from the first connecting portion 17 toward the first rear end 14 is referred to as a first body portion 19. The first skin 10 includes a first thin film portion 18 and a first body portion 19.

The second skin 20 is, for example, a member located below the composite material joint body 1. The second skin 20 is a wing-shaped member extending in the Y axial direction. The second skin 20 includes a skin-like composite material.

The second skin 20 has a second surface 21 and a second back surface 22 opposite the second surface 21. The second skin 20 also has a second rear end 24 opposite the second front end 23 and the second front end 23. Further, the second skin 20 has a second wing tip portion 26 opposite the second root portion 25 and the second root portion 25.

A portion of the second skin 20 on the second front end 23 side may be thinner than other portions. For example, a portion of the second front end 23 side of the second surface 21 of the second skin 20 may be cut to be thinner than other portions. For example, a portion of the second skin 20 on the second connecting portion 27 to the second front end 23 side has a thin film shape. A portion of the second skin 20 from the second connecting portion 27 to the second front end 23 side is referred to as a second thin film portion 28. A portion of the second skin 20 from the second connecting portion 27 toward the second rear end 24 is referred to as a second main body portion 29. The second skin 20 includes a second thin film portion 28 and a second main body portion 29.

When viewed in the Y axial direction, the second main body portion 29 is curved downward in a convex shape. The second main body portion 29 has a second surface 21 on −Z axial direction side and a second back surface 22 on the +Z axial direction side. The second main body portion 29 has a second rear end 24 on the +X axial direction side, and has a second connecting portion 27 on −X axial direction side. The second thin film portion 28 has a second front end 23 on the +X axial direction side and a second connecting portion 27 on −X axial direction side. That is, the second skin 20 may be curved such that the second back surface 22 is turned inward at the second connecting portion 27. The second main body portion 29 and the second thin film portion 28 have a second root portion 25 on −Y axial direction side and a second wing tip portion 26 on the +Y axial direction side.

The first thin film portion 18 and the second thin film portion 28 overlap with the adhesive 40 interposed therebetween. Specifically, the first thin film portion 18 and the second thin film portion 28 are overlapped such that the first front end 13 and the second connecting portion 27 face each other and the second front end 23 and the first connecting portion 17 face each other. Therefore, a portion of the first front end 13 side of the first back surface 12 and a portion of the second front end 23 side of the second surface 21 are overlapped so as to face each other across the adhesive 40 to form an overlapped portion.

The spar 30 is disposed, for example, between the first back surface 12 of the first skin 10 and the second back surface 22 of the second skin 20. The spar 30 is a cylindrical member extending in the Y axial direction. When viewed in the Y axial direction, the cross section of the spar 30 has a rectangular shape. Thus, the spar 30 includes an upper wall portion 31, a lower wall portion 32, a front wall portion 33, and a rear wall portion 34. The surface 35 on the +Z axial direction side of the upper wall portion 31 of the spar 30 is bonded to the first back surface 12 with an adhesive 40. −Z axial surface 36 of the lower wall portion 32 of the spar 30 is bonded to the second back surface 22 with an adhesive 40. The end portion of the spar 30 on −Y axial direction side protrudes to the −Y axial direction side from the first root portion 15 and the second root portion 25 on −Y axial direction side of the first skin 10 and the second skin 20. −Y axial end of the spar 30 may be connected to the tubular sleeves 5. An end portion of the spar 30 on the +Y axial direction side is located between the first skin 10 and the second skin 20. Therefore, the end portion of the spar 30 on the +Y axial direction side is disposed in a state of being opened in a space surrounded by the first back surface 12 and the second back surface 22.

The adhesive 40 is, for example, a thin film-like adhesive. The adhesive 40 is disposed between the first thin film portion 18 and the second thin film portion 28, between the first back surface 12 and the spar 30, between the second back surface 22 and the spar 30, a portion of the first rear end 14 side of the first back surface 12, and a portion of the second rear end 24 side of the second back surface 22.

The composite material joint body 1 includes, for example, a first cell C1, a second cell C2, and a third cell C3. The first cell C1 adjoins the second cell C2. The second cell C2 adjoins the first cell C1 and the third cell C3. The third cell C3 adjoins the second cell C2.

The first cell C1 is formed on the first front end 13 side and the second front end 23 side of the spar 30 between the first back surface 12 of the first skin 10 and the second back surface 22 of the second skin 20. The first cell member surrounding the first cell C1 includes a first thin film portion 18 and a second thin film portion 28, a portion of the first skin 10 on −X axial side relative to the spar 30, a portion of the second skin 20 on −X axial side relative to the spar 30, and a front wall portion 33 of the spar 30. Therefore, a portion of the first cell member has an overlapping portion in which the plurality of composite materials overlap in the thickness direction of the first cell member with the adhesive 40 interposed therebetween. The overlapping portion overlaps, for example, the second thin film portion 28, the adhesive 40, and the first thin film portion 18 in this order toward the outside in the thickness direction of the first cell member. The overlapping portions may overlap in the order of the first thin film portion 18, the adhesive 40, and second thin film portion 28 toward the outside in the thickness direction of the first cell member.

The second cell C2 is formed inside the spar 30. That is, the second cell C2 includes a space surrounded by the spar 30. The second cell member surrounding the second cell C2 includes an upper wall portion 31, a lower wall portion 32, a front wall portion 33, and a rear wall portion 34 of the spar 30.

The third cell C3 is formed on the first rear end 14 side and the second rear end 24 side of the spar 30 between the first back surface 12 of the first skin 10 and the second back surface 22 of the second skin 20. The third cell member surrounding the third cell C3 has a portion on the +X axial direction side with respect to the spar 30 of the first skin 10, a portion on the +X axial direction side with respect to the spar 30 of the second skin 20, and a rear wall portion 34 of the spar 30.

Figure 4:
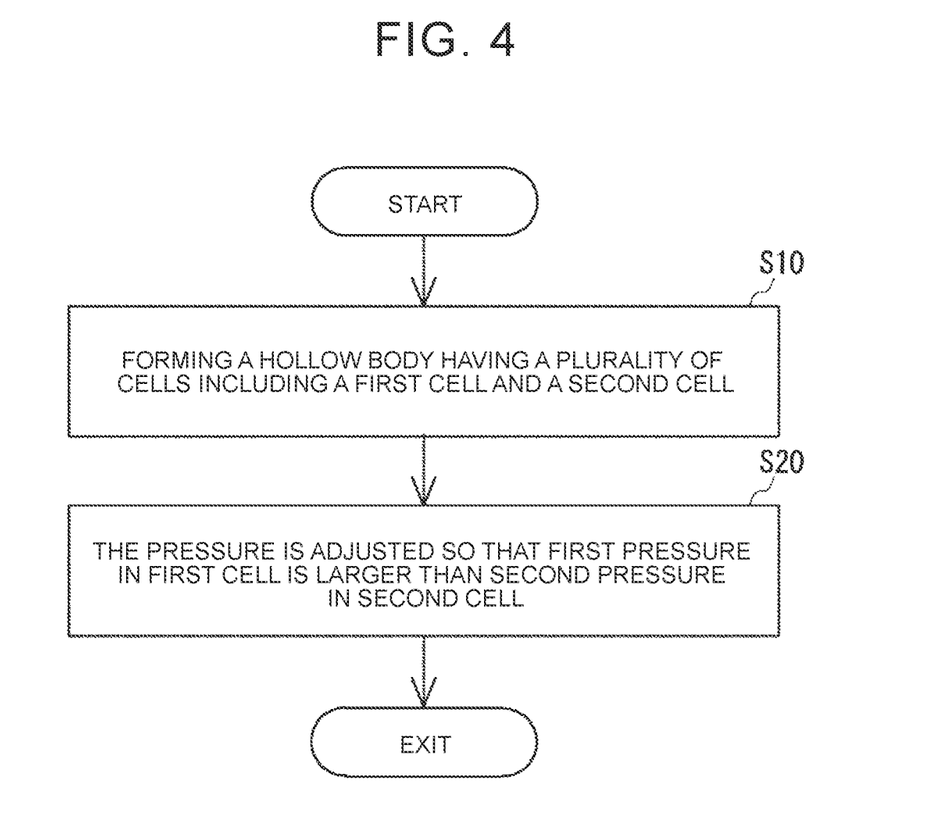
FIG. 4 is a flowchart illustrating a method for producing the composite material joint body according to the first embodiment.
Figure 5:
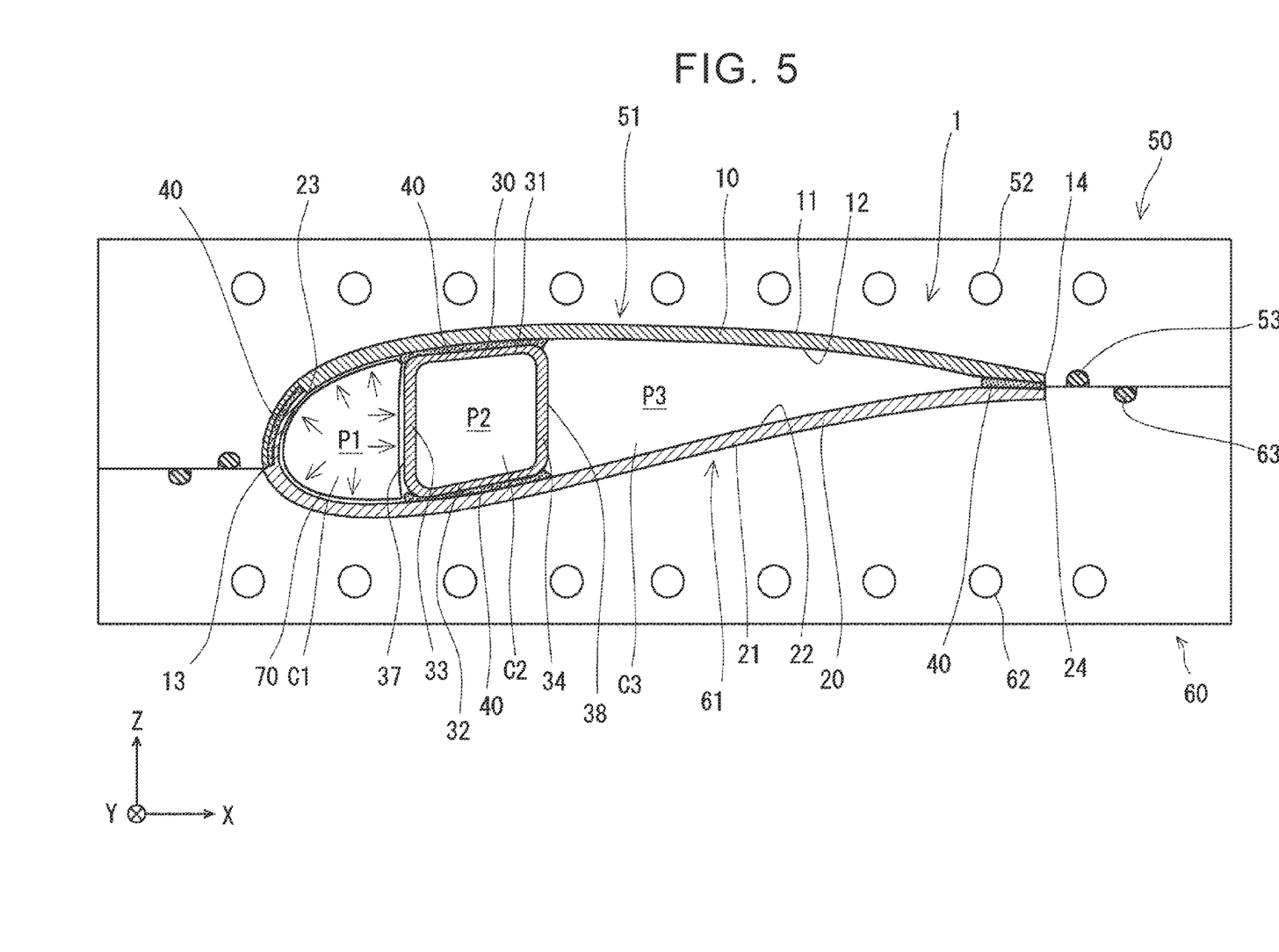
FIG. 5 is a cross-sectional view illustrating a hollow body according to the first embodiment.

Next, a method for producing the composite material joint body of the present embodiment will be described. FIG. 4 is a flowchart illustrating a method for producing the composite material joint body according to the first embodiment. FIG. 5 is a cross-sectional view illustrating the hollow body according to the first embodiment. As shown in FIGS. 4 and 5, the method for producing the composite material joint body 1 of the present embodiment includes a S10 for forming a hollow body having a plurality of cells including a first cell and a second cell, and a S20 for adjusting the pressure so that the first pressure in the first cell is greater than the second pressure in the second cell.

In a S10 of forming a hollow body, a plurality of resin-impregnated composite materials are bonded to a fiber to form a hollow body having a plurality of cells including at least a first cell C1 and a second cell C2 adjoining the first cell C1. The first cell C1 includes an expansion member 70.

The expansion member 70 is, for example, a bag-shaped member such as a bladder bag, and is a bag that expands by introducing a gas into the bag. Note that the expansion member 70 is not limited to a bladder bag, and may be a member that expands by applying heat such as a mandrel. The expansion member 70 may include at least one of a bladder back and a mandrel. The expansion member 70 contacts the first inner surface of the first cell member facing the first cell C1 and pressurizes the first inner surface.

The first inner surface is a surface surrounding the first cell C1, and specifically includes a portion of the first skin 10 on −X axial side of the spar 30 on the first back surface 12, a portion of the second back surface 22 of the second skin 20 on −X axial side of the spar 30, and a surface 37 of the front wall portion 33 of the spar 30 on −X axial side.

The second cell C2 includes a gas contacting the second inner surface of the second cell member facing the second cell C2 and pressurizing the second inner surface. The gas is, for example, air. The second inner surface is a surface surrounding the second cell C2, and specifically, has a lower surface of the upper wall portion 31 of the spar 30, an upper surface of the lower wall portion 32, a surface of the front wall portion 33 on the +X axial direction side, and a surface of the rear wall portion 34 on −X axial direction side.

The third cell C3 includes a gas that contacts a third inner surface of the third cell member facing the third cell C3 and pressurizes the third inner surface. The third inner surface is a surface surrounding the third cell C3, and specifically includes a portion on the +X axial direction side of the spar 30 on the first back surface 12 of the first skin 10, a portion on the +X axial direction side of the spar 30 on the second back surface 22 of the second skin 20, and a surface 38 on the +X axial direction side of the rear wall portion 34 of the spar 30.

In S10 of forming the hollow body, a portion of the first cell member includes an overlapping portion in which the plurality of composite materials overlap with the adhesive 40 in the thickness direction of the first cell member. Specifically, a portion of the first front end 13 side of the first back surface 12 and a portion of the second front end 23 side of the second surface 21 overlap each other so as to face each other across the adhesive 40 to form an overlapping portion.

Figure 6:
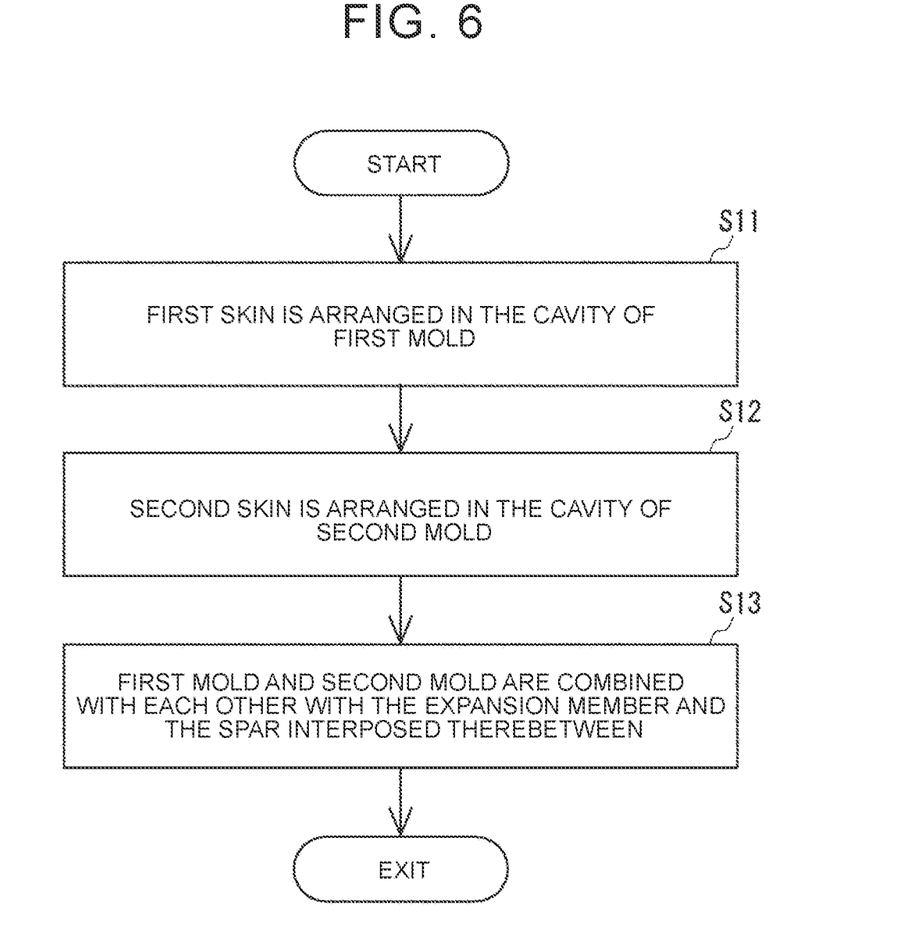
FIG. 6 is a flowchart illustrating steps of forming a hollow body according to the first embodiment.

FIG. 6 is a flowchart illustrating steps of forming a hollow body according to the first embodiment. As shown in FIGS. 4 to 6, the step of forming the hollow body has S13 of aligning the first mold 50 and the second mold 60 with the expansion member 70 and the spar 30 in S11 where the first skin 10 is disposed in the cavity 51 of the first mold 50, in S12 where the second skin 20 is disposed in the cavity 61 of the second mold 60. Note that the order of S11 and S12 is not limited to this, and S11 may be performed after S12 or in parallel with S12.

In the present embodiment, in the step of forming the hollow body, a mold structure including the first mold 50 and the second mold 60 is used. The first mold 50 includes a cavity 51, a temperature control pipe 52, and a seal structure 53. The second mold 60 includes a cavity 61, a temperature control pipe 62, and a seal structure 63. The mold structure can be opened and closed vertically. In the mold structure, the temperature of the hollow body can be adjusted by the temperature control pipes 52 and 62. In FIG. 5, some reference numerals are omitted so as not to complicate the drawing. In addition, hatching of the cross sections of the first mold 50 and the second mold 60 is omitted.

In S11, a first skin 10 comprising a skin-like composite material having a first surface 11 and a first back surface 12 opposite the first surface 11 and having a first front end 13 and a first rear end 14 opposite the first front end 13 is disposed in the first mold 50 such that the first surface 11 is toward the cavity 51.

In S12, a second skin 20 having a second surface 21 and a second back surface 22 opposite the second surface 21 and including a skin-like composite material having a second front end 23 and a second rear end 24 opposite the second front end 23 is disposed in the second mold 60 such that the second surface 21 is toward the cavity 61.

Next, in S13, the first mold 50 and the second mold 60 are combined with each other with the expansion member 70 and the cylindrical spar 30 interposed therebetween. In S13, a spar 30 is disposed between the first back surface 12 of the first skin 10 and the second back surface 22 of the second skin 20. Further, a portion of the first front end 13 side of the first back surface 12 and a portion of the second front end 23 side of the second surface 21 are overlapped so as to face each other across the adhesive 40 to form an overlapping portion. Further, the adhesive 40 is disposed between the first back surface 12 and the spar 30, between the second back surface 22 and the spar 30, and between a portion of the first rear end 14 side of the first back surface 12 and a portion of the second rear end 24 side of the second back surface 22.

Then, the expansion member 70 is disposed so as to be included in the first cell C1 formed on the first front end 13 side and the second front end 23 side of the spar 30 between the first back surface 12 and the second back surface 22. Further, gas is introduced into the second cell C2 formed inside the spar 30 and the third cell C3 formed on the first rear end 14 side and the second rear end 24 side of the spar 30 between the first back surface 12 and the second back surface 22. In this way, a hollow body is formed.

Next, as shown in S20, the pressure is adjusted so that the first pressure P1 in the first cell C1 is larger than the second pressure P2 in the second cell C2. Specifically, in S20 of adjusting the pressure, the first pressure P1 generated by the expansion member 70 pressurizing the first inner surface is made larger than the second pressure P2 generated by the gas pressurizing the second inner surface. For example, when the expansion member 70 is a bladder bag, gas is introduced into the bladder bag so that the expansion member 70 pressurizes the first inner surface with the first pressure P1. On the other hand, the sleeve 5 is attached to −Y axial end portion of the spar 30, and gas is introduced into the second cell C2 inside the spar 30 through the sleeve 5. This causes the gas to pressurize the second inner surface with the second pressure P2.

Further, the first pressure P1 generated when the expansion member 70 pressurizes the first inner surface is made larger than the third pressure P3 generated when the gas pressurizes the third inner surface. For example, an end portion of the spar 30 on the +Y axial direction side is open between the first back surface 12 and the second back surface 22. In this manner, the second cell C2 and the third cell C3 may be communicated with each other. That is, the gas introduced into the spar 30 is introduced into the third cell C3 through the +Y axial-direction opening of the spar 30.

When it is difficult to insert or remove the expansion member 70 into or from the second cell C2 and the third cell C3 due to the undercut configuration or the like, the second inner surface of the second cell C2 and the third inner surface of the third cell C3 may be pressurized with a direct gas. Therefore, the second pressure P2 and the third pressure P3 may have the same pressure. Therefore, the pressure may be adjusted so as to satisfy the following equation (1).

$$P1>P2=P3 \tag{1}$$

In order to bring the adhesive surfaces of the first thin film portion 18 and the second thin film portion 28 into close contact with each other, the expansion member 70 for pressurization is inserted into the first cell C1. Accordingly, the first pressure P1 is applied to the first cell C1. In addition, a second pressure P2 is added to the second cell C2 in order to bring the adhesion surface between the spar 30 and the first skin 10 and the second skin 20 into close contact with each other. Pressure is also applied to each cell to align the shapes of the first skin 10 and the second skin with the cavity surface.

When the first pressure P1 is equal to or lower than the second pressure P2 (and the third pressure P3), the second pressure P2 (and the third pressure P3) is also applied to the adhesive surfaces of the first thin film portion 18 and the second thin film portion 28. This may adversely affect the adhesive surface and may not adhere sufficiently. Therefore, the first pressure P1 is set to the highest pressure. The second pressure and the third pressure are adjusted by the first pressure P1 so that the position of the spar 30 is not shifted in the +X axial direction.

When the spar 30 is sandwiched between the first skin 10 and the second skin 20 and the first mold 50 and the second mold 60 are combined, if the spar 30 has enough stiffness that the surface does not deform such as depression in addition to the warp deformation is corrected, the second cell C2 may be at atmospheric pressure without applying pressure. In addition, the third pressure P3 is added to the third cell C3 so that the first skin 10 and the second skin 20 constituting the third cell member do not deteriorate surface qualities due to softening caused by heating. When the first skin 10 and the second skin 20 are stiff enough not to deteriorate the surface qualities due to heating, they may be at atmospheric pressure without applying pressure to the third cell C3. Further, when the positional accuracy of the spar 30 is not a problem, it is not necessarily the pressure relationship of equation (1).

After S20, the adhesive 40 is cured. For example, the adhesive 40 may be cured by heat treatment or the like. At this time, the composite material of the first skin 10 and the second skin 20 may be cured. Then, the composite material joint body 1 can be manufactured by opening the first mold 50 and the second mold 60 and taking out the expansion member 70.

Figure 7:
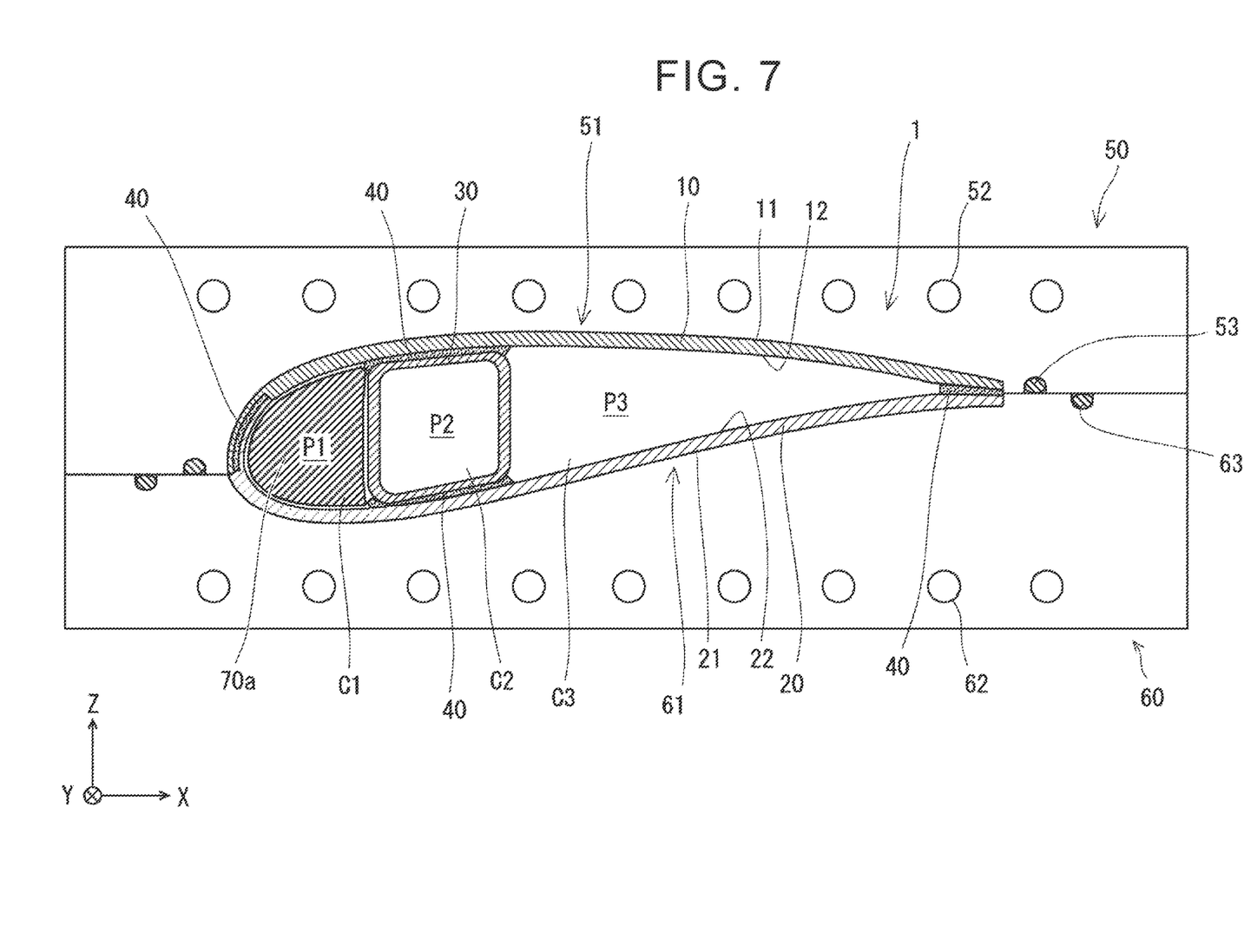
FIG. 7 is a cross-sectional view illustrating a hollow body according to another example of the first embodiment.

FIG. 7 is a sectional view illustrating a hollow body according to another example of the first embodiment. As shown in FIG. 7, the expansion member 70a may be a mandrel that expands by applying heat. In this case, in S20, the temperature is adjusted by the temperature control pipe 52 in the first mold 50 and the temperature control pipe 62 in the second mold 60, and the first pressure P1 is made larger than the second pressure P2 and the third pressure P3.

Next, the effects of this embodiment will be described. In the method for producing the composite material joint body 1 of the present embodiment, the first cell C1 includes the expansion member 70, and the second cell C2 and the third cell C3 include a gas, and the pressure is adjusted so that the first pressure P1 in the first cell C1 is larger than the second pressure P2 in the second cell C2 and the third pressure P3 in the third cell. Accordingly, since the second cell C2 or the like includes an undercut shape or the like, the adhesion between the first skin 10 and the second skin 20 and the spar 30 can be maintained even when the expansion member 70 such as a bladder bag is difficult to be inserted. On the other hand, since the expansion member 70 can be inserted into the first cell C1, the adhesive force of the overlapping part where the first thin film portion 18 and the second thin film portion 28 overlap can be maintained.

The expansion member 70 may be a bladder bag that expands by introducing a gas therein, or a mandrel that expands by applying heat. In the case of the mandrel, the first pressure P1 in the first cell C1 can be made larger than the second pressure P2 in the second cell C2 by adjusting the temperatures of the first mold 50 and the second mold. Therefore, it is possible to incorporate the first skin 10 and the second skin 20 into the heat treatment, and it is possible to increase the efficiency of the manufacturing process.

Second Embodiment

Figure 8:
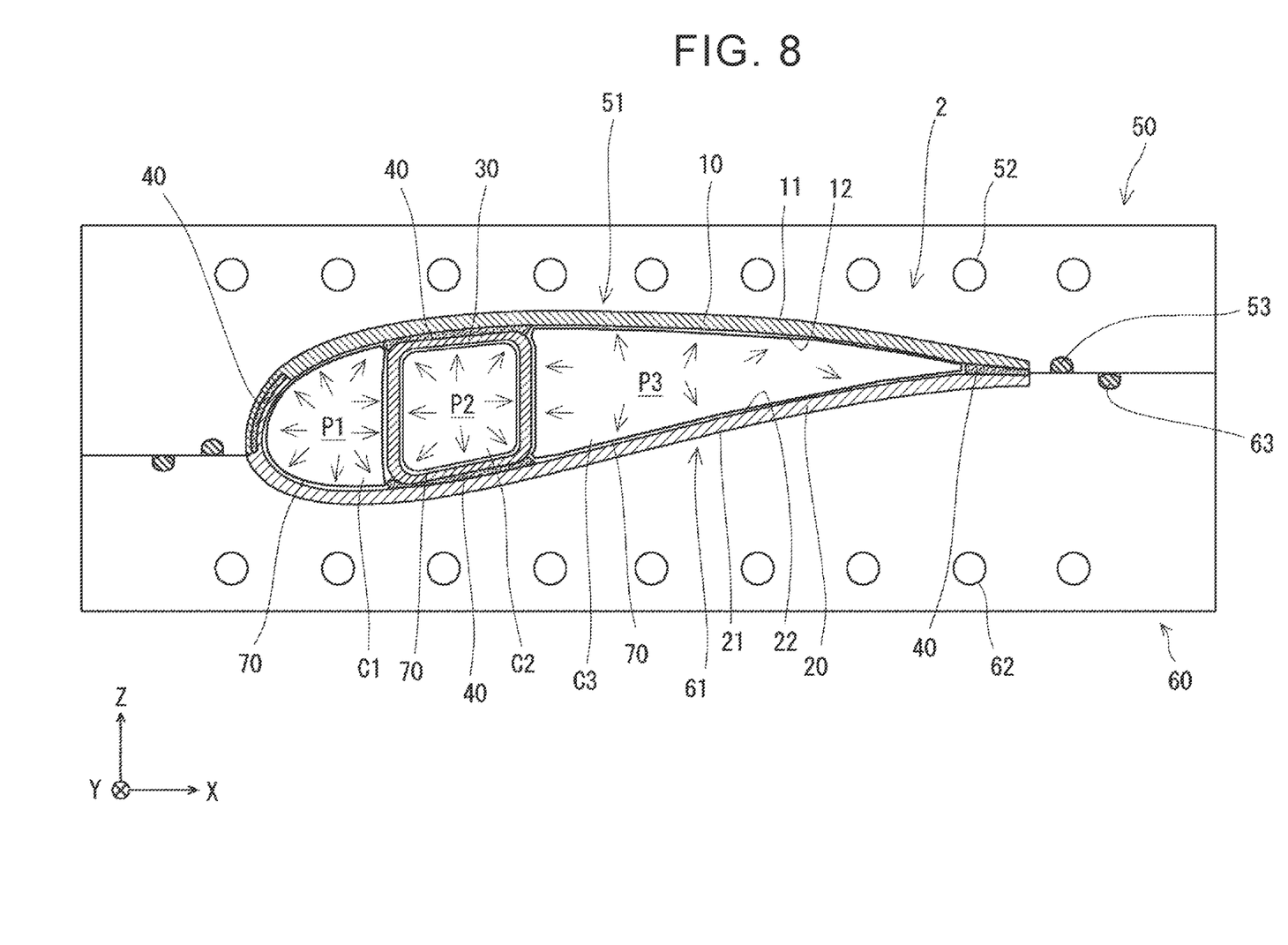
FIG. 8 is a cross-sectional view illustrating the hollow body according to the second embodiment.

Next, a method for producing the composite material joint body 2 according to the second embodiment will be described. In the present embodiment, the first cell C1, the second cell C2, and the third cell C3 both allow the expansion member 70 to be inserted and removed, and the expansion member 70 is inserted into the first cell C1, the second cell C2, and the third cell C3. FIG. 8 is a cross-sectional view illustrating the hollow body according to the second embodiment. As shown in FIG. 8, in the present embodiment, in a S13 where the first mold 50 and the second mold 60 are combined with each other with the expansion member 70 and the cylindrical spar 30 interposed therebetween, the expansion member 70 is inserted into the first cell C1, the second cell C2, and the third cell C3. The expansion member 70 may be a bladder bag or a mandrel. The relation between the first pressure in the first cell C1, the second pressure in the second cell C2, and the third pressure in the third cell C3 is not limited to the above equation (1), and may be the same pressure as the following equation (2). In this case, it is easy to ensure the accuracy of the position of the spar 30.

$$P1=P2=P3 \tag{2}$$

According to the present embodiment, the accuracy of the position of the spar 30 can be improved. Other configurations and effects are included in the description of the first embodiment.

Although the embodiments of the present disclosure have been described above, the present disclosure includes appropriate modifications that do not impair the objects and advantages thereof, and further, the present disclosure is not limited by the above-described embodiments. Further, each configuration in the first embodiment may be combined as appropriate.

What is claimed is:

1. A method for producing a composite material joint body comprising:
   a step of forming a hollow body including a plurality of cells including at least a first cell and a second cell adjacent to the first cell in the hollow body by joining a plurality of composite materials in which a resin is impregnated with a fiber; and
   a step of adjusting pressure such that a first pressure in the first cell is greater than a second pressure in the second cell, wherein:
   in the step of forming the hollow body, the first cell includes an expansion member that pressurizes a first inner surface in contact with the first inner surface facing the first cell of a first cell member that surrounds the first cell;

in the step of forming the hollow body, the second cell includes gas that pressurizes a second inner surface in contact with the second inner surface facing the second cell of a second cell member that surrounds the second cell; the step of forming the hollow body includes a step of disposing a first mold such that a first surface of a first skin including the composite materials having skin shapes is set on a cavity side, the first skin including the first surface and a first back surface on an opposite side of the first surface and including a first front end and a first rear end on an opposite side of the first front end;

the step of forming the hollow body includes a step of disposing a second mold such that a second surface of a second skin including the composite materials having skin shapes is set on the cavity side, the second skin including the second surface and a second back surface on an opposite side of the second surface and including a second front end and a second rear end on an opposite side of the second front end; in the step of adjusting the pressure, the first pressure generated by the expansion member pressurizing the first inner surface is increased as compared with the second pressure generated by the gas pressurizing the second inner surface;

the expansion member is a mandrel that expands due to application of heat; and in the step of adjusting the pressure, a temperature is adjusted by a temperature control pipe in the first mold and the second mold, and the first pressure is increased as compared with the second pressure.

2. The method according to claim 1, wherein in the step of forming the hollow body, a portion of the first cell member includes an overlapping portion in which the composite materials overlap each other in a thickness direction of the first cell member with an adhesive interposed between the composite materials.

3. The method according to claim 2, wherein:

the step of forming the hollow body includes a step of combining the first mold and the second mold with the expansion member and a spar interposed between the first mold and the second mold;

in the step of combining the first mold and the second mold, the spar is disposed between the first back surface and the second back surface;

in the step of combining the first mold and the second mold, the overlapping portion is provided so as to be overlapped such that a portion of the first back surface on the first front end side and a portion of the second surface on the second front end side face each other with the adhesive interposed between the portion of the first back surface and the portion of the second surface;

in the step of combining the first mold and the second mold, the adhesive is disposed between the first back surface and the spar, between the second back surface and the spar, and between a portion of the first back surface on the first rear end side and a portion of the second back surface on the second rear end side;

in the step of combining the first mold and the second mold, the expansion member is disposed so as to be included in the first cell provided on the first front end side and the second front end side with respect to the spar between the first back surface and the second back surface; and in the step of combining the first mold and the second mold, the gas is introduced into the second cell provided inside the spar.

* * * * *